US010192213B2

(12) United States Patent
Bonsi et al.

(10) Patent No.: US 10,192,213 B2
(45) Date of Patent: Jan. 29, 2019

(54) MOBILE PAYMENT SYSTEM AND METHOD

(71) Applicant: Bleu Tech Enterprises, Inc., Los Angeles, CA (US)

(72) Inventors: Sesie K. Bonsi, North Hollywood, CA (US); Timur Valitov, St. Petersburg (RU); Emil Baibagyshev, St. Petersburg (RU); Nikolay Rogozhnikov, St. Petersburg (RU); Alexey Modiagin, St. Petersburg (RU)

(73) Assignee: Bleu Tech Enterprises, Inc., Los Angeles, CA (US)

( * ) Notice: Subject to any disclaimer, the term of this patent is extended or adjusted under 35 U.S.C. 154(b) by 295 days.

(21) Appl. No.: 15/228,914

(22) Filed: Aug. 4, 2016

(65) Prior Publication Data

US 2017/0039547 A1 Feb. 9, 2017

Related U.S. Application Data

(60) Provisional application No. 62/202,250, filed on Aug. 7, 2015, provisional application No. 62/210,696, filed on Aug. 27, 2015.

(51) Int. Cl.
*G06Q 20/32* (2012.01)
*G06Q 20/20* (2012.01)
*H04W 4/80* (2018.01)

(52) U.S. Cl.
CPC ......... *G06Q 20/3278* (2013.01); *G06Q 20/20* (2013.01); *H04W 4/80* (2018.02)

(58) Field of Classification Search
None
See application file for complete search history.

(56) References Cited

U.S. PATENT DOCUMENTS

2013/0278122 A1* 10/2013 Edwards ............... E05B 65/461
312/237
2014/0036304 A1 2/2014 Takasu
2015/0109311 A1 4/2015 Aoki et al.

OTHER PUBLICATIONS

Lunn, John, "How Does PayPal Beacon Work", PayPal & Braintree Developer Blog, https://devblog.paypal.com, 6 pages, Sep. 10, 2013.
Bleu Tech Enterprises, Inc, PCT/US16/45623 filed Aug. 4, 2016, "The International Search Report and the Written Opinion of the International Searching Authority, or the Declaration", dated Dec. 19, 2016.

* cited by examiner

*Primary Examiner* — Kristy A Haupt
(74) *Attorney, Agent, or Firm* — McKee, Voorhees & Sease, PLC

(57) ABSTRACT

A mobile point of sale system and method uses a mobile point of sale terminal, a mobile device programmed with an app, and low energy network beacons. A cloud server communicates with the mobile point of sale terminal to manage the system and retain data. The beacons can be used to track location of a customer within a merchant to push information to the customer. The cloud server can use stored information about the customer to better target information and offers sent to the customer and to facilitate improved payment processing.

4 Claims, 8 Drawing Sheets

Recent Activity
10 day(s) since last visit

| Date/Time | Orders | Amount | Store Name | Address |
|---|---|---|---|---|
| 3/30/16 5:54 PM | 22 | $1.84 | | 1825 East University Drive |
| 3/30/16 1:58 PM | 30 | $1.84 | | 1825 East University Drive |
| 3/24/16 9:17 PM | 1 | $2.08 | | 1825 East University Drive |
| 3/30/16 1:16 PM | 28 | $1.84 | | 1825 East University Drive |
| 3/29/16 1:22 PM | 15 | $1.84 | | 1825 East University Drive |
| 3/22/16 8:51 PM | 22 | $1.84 | | 1825 East University Drive |
| 4/4/16 4:39 PM | 1 | | | |

*FIG. 7*

MOBILE PAYMENT SYSTEM AND METHOD

CROSS-REFERENCE TO RELATED APPLICATIONS

This application claims the benefit of U.S. Provisional Patent Application No. 62/202,250 filed Aug. 7, 2015 and of U.S. Provisional Patent Application No. 62/210,696 filed Aug. 27, 2015, both of which are hereby incorporated by reference in their entireties.

FIELD OF INVENTION

The present invention relates generally to systems and methods for managing electronic payments made by customers. More particularly, the present invention relates to a proximity payment system and method that utilizes mobile technology.

BACKGROUND OF THE INVENTION

Traditional point of sale terminals comprise primarily a cash register that interfaces with separate hardware for entering purchases and receiving payment. Such hardware may include optical scanners such as bar code readers and QR code readers for quickly generating purchase orders. The legacy point of sale terminals also commonly include magnetic strip card readers for processing payments. However, these legacy systems do not allow for integration with mobile technology.

Wireless point of sale terminals have been developed. However, these have suffered from several deficiencies, including especially a large space profile, separate manufactures for various components that must be joined together. These older wireless point of sale terminals have been required to be compatible with specific processors.

Payment systems and processes could be improved by better integration of the components and better collection and use of consumer data.

SUMMARY OF THE INVENTION

According to one embodiment, the invention is an improved mobile payment system. In general the system permits for improved ability to process electronic payments. The system uses beacons, such as dual Wi-Fi and Bluetooth Low Energy radio beacons to collect information from and provide information to user's mobile devices. The enhanced ability to provide and collect information is a significant advance over existing systems. The beacons preferably use the Bluetooth Low Energy (BLE) protocol (also known as Bluetooth Smart). Using the beacons permits the system to track when a consumer has entered a merchant, or in some cases when the user is in the neighborhood of the merchant. This information can be used in more or less real time to push notifications and offers to the consumer. Additionally, the beacons can be used to track a consumer's location within a store, so that the offers can be targeted to the specific sections of a store that the consumer has shown interest by spending time. Furthermore, the history of the consumer may be tracked to notice patterns or long absences that might be overcome by providing special offers to the user communicated through the user's mobile device. The system will include software apps on the user's mobile device and the merchant's point of sale terminal.

According to another embodiment, a mobile payment system has a mobile point of sale terminal. The mobile point of sale terminal includes cash register equipment, such as a cash drawer, payment receiving means such as payment card readers, and merchandise code readers such as bar code scanners and QR code scanners. This mobile payment system also includes a payment beacon, the payment beacon adapted to communicate with mobile devices programmed with a payment application. A wireless router is in communication with a management server, which may be a cloud server. The cloud server acts as the primary management device for the system. A payment server is programmed with a tokenization application processing interface (tokenization API). A plurality of proximity beacons transmit to, and receive information from mobile devices programmed with the customer application. The proximity beacons may be provided at several locations within a merchant to permit tracking of a consumer within the merchant. A hub beacon serves as a hub to communicate between the wireless router, the proximity beacons and payment beacons. The cloud server is adapted to receive and store data from the wireless router and to control the hub beacon, the payment beacon, and the universal payment gateway device. The cloud server will also store information about the consumers, their interactions with the merchant, and their purchasing history.

According to another embodiment the invention is directed to a mobile point of sale terminal that has a cash drawer; a card reader for reading payment information from a payment card; an optical code scanner; and a mobile tablet. The mobile tablet is adapted to communicate with the cash drawer, the card reader and the optical scanner. The mobile tablet a touch screen for displaying information and providing input, and a computer processor programmed to control the cash drawer, the card reader, and the optical scanner. A stand supports the mobile tablet on the cash drawer, the stand including a plurality of inputs for payment system hardware to permit payment system hardware to communicate with the mobile tablet. A printer may be integrated with the stand. The stand may adapted to permit the mobile tablet to swivel to facilitate entry of a customer verification through the mobile tablet touch screen.

According to another embodiment, the present invention is directed to a mobile payment system that includes a mobile point of sale terminal that has a payment beacon, the payment beacon being adapted to communicate with mobile devices programmed with a customer application. A wireless router is in communication with a management server. A payment server is programmed with a tokenization application processing interface (tokenization API). A plurality of proximity beacons transmit to and receive information from mobile devices programmed with the customer application. A hub beacon is adapted to communicate between the wireless router and the proximity beacons. The management server is adapted to receive and store data from the wireless router and to control the hub beacon, the payment beacon, and the universal payment gateway device.

According to another embodiment, the present invention is directed to a method of processing an electronic payment. The method includes providing a mobile app that can be downloaded to a customer's mobile device. A mobile point of sale terminal is provided that includes a mobile tablet at a merchant location. A wireless router is in communication with a management server. A signal indicating an order from a customer is received at the mobile tablet, wherein the order was placed by the customer using a mobile store-front generated by the mobile app on the customer's mobile device, and wherein the order is an item for purchase by the customer. A notification is provided on the mobile tablet that the order has been placed. The order is reviewed on the mobile tablet to approve or decline the order. A notice is sent to the customer's mobile device using the wireless router and the management server indicating whether the order was approved or declined. If the order is approved in the reviewing step, then the management server sends an approval notice to the customer's mobile device. The customer's mobile device sends the approval notice, a token, and payment amount to a payment server. The payment server submits a payment request for the payment amount to a payment processor server for approval. The payment processor server notifies the payment server whether the payment request is approved or declined. The payment server notifies the customer's mobile device and the mobile point of sale terminal whether payment was approved or declined. If the payment was approved the mobile point of sale terminal generates an order ticket. Once the order ticket has been completed, the mobile point of sale terminal notifies the customer's mobile device using the Wi-Fi router and the management server. When the customer's mobile device is within proximity of the payment beacon, the payment beacon causes the mobile tablet to display a notification so that the merchant can present the customer with their order.

According to yet another embodiment of the present invention, a method of processing an electronic payment includes providing a mobile app downloaded to a customer's mobile device, whereby the mobile app generates a token that resides on the customer's mobile device imbedded within the mobile app. A mobile point of sale terminal including a payment beacon, a hub beacon, a plurality of proximity beacons, and a mobile tablet is provided at a merchant location. A wireless router is provided in communication with a management server. The proximity beacons are connected with the customer's mobile device to deliver content to the customer's mobile device and to track movement of the customer within the merchant. A profile of a customer is displayed on the mobile tablet. Indicators of items selected for purchase by the customer are placed on the customer's profile using the mobile tablet. A request for payment is sent to the customer's mobile device, whereby the customer's mobile device sends the token to a payment server, whereby the payment server submits a payment request to a payment processor server for approval, and the payment processor server notifies the payment server whether the payment request is approved or declined, and the payment server notifies the customer's mobile device and the mobile point of sale terminal whether payment was approved or declined. If the payment was approved, an indication on the mobile tablet of the approval so that the merchant can present the customer with the items selected for purchase is generated.

BRIEF DESCRIPTION OF THE DRAWINGS

FIG. 7 is a screen of a computer showing a customer recent activity screen of a back-end software app used in a point of sale terminal in some embodiments of the present invention.

DESCRIPTION OF PREFERRED EMBODIMENTS

Figure 1:
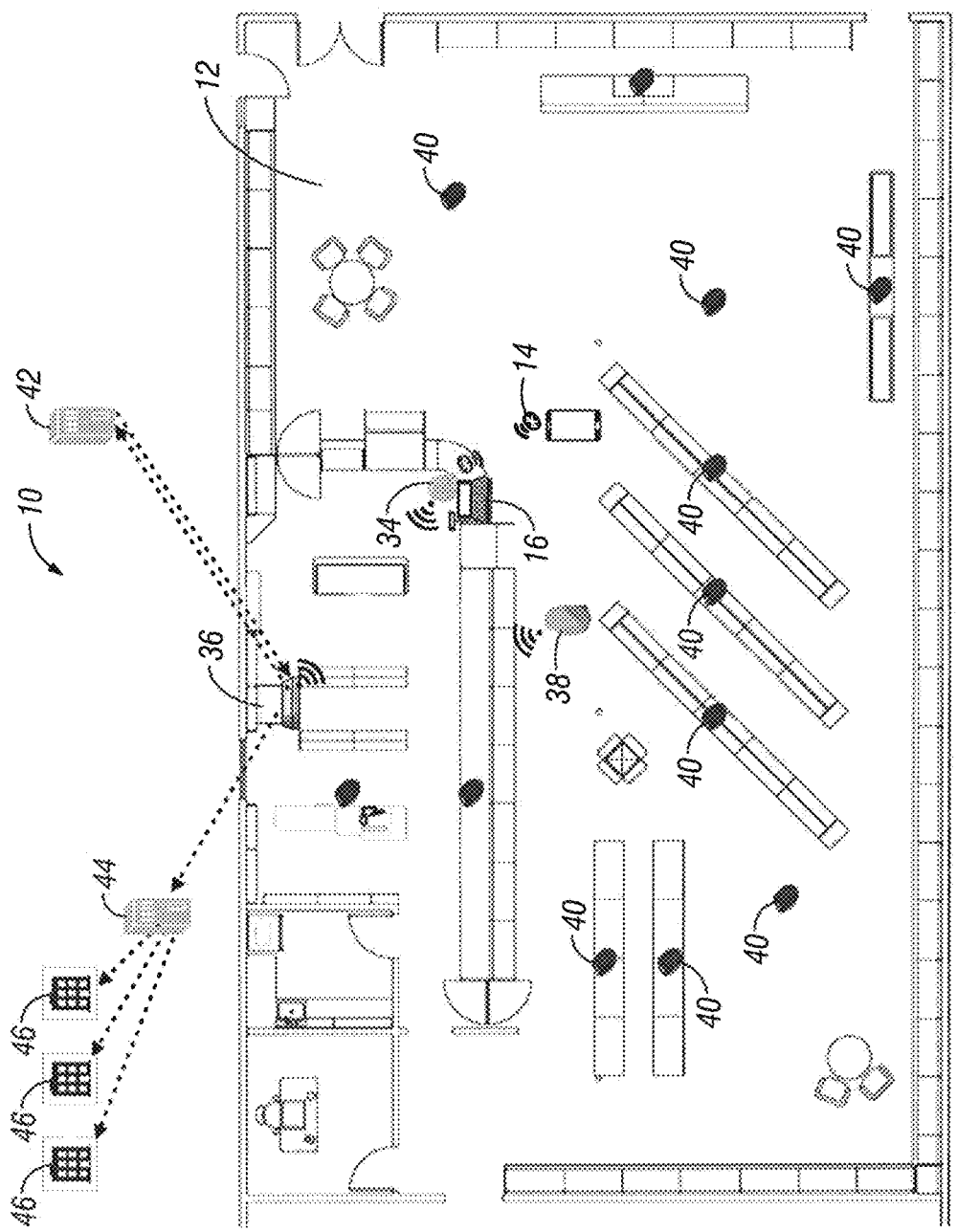
FIG. 1 is a schematic plan view of a merchant location including a mobile payment system according to the present invention.
Figure 2:
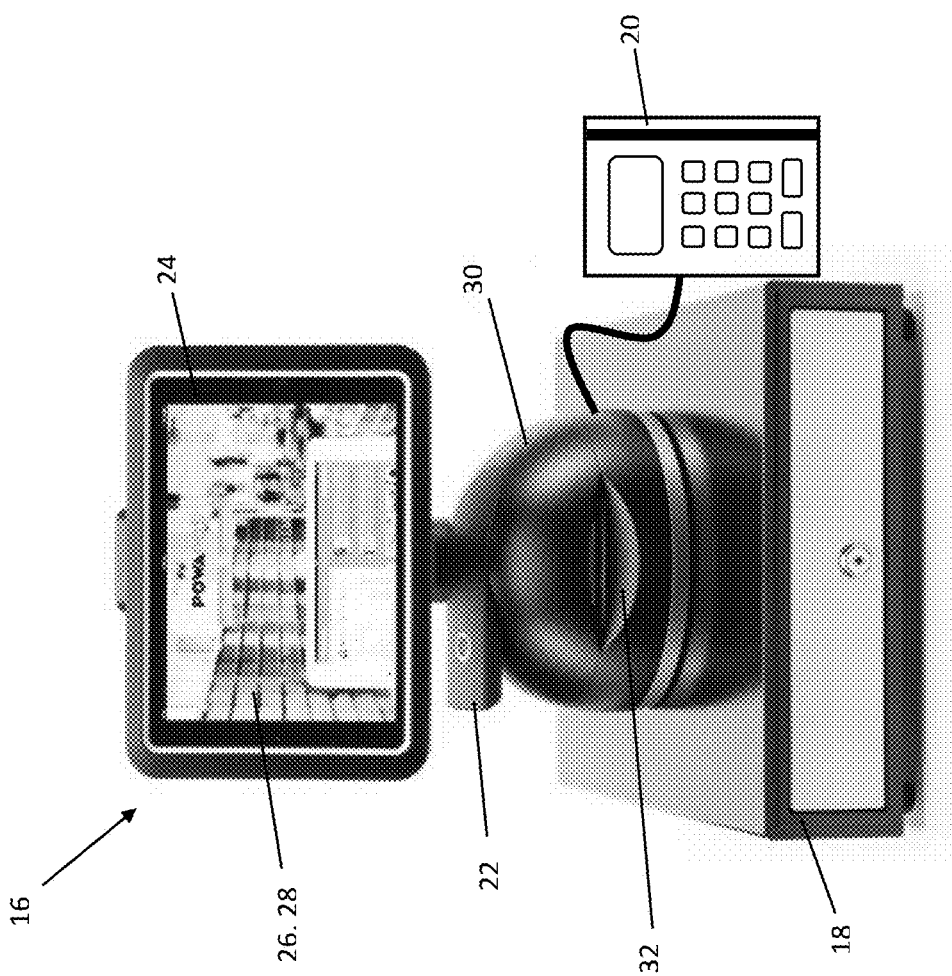
FIG. 2 is a front elevation view of a point of sale terminal according to one embodiment of the present invention.

FIG. 1 shows a payment system 10 in a merchant location 12 according to one embodiment of the present invention. The merchant location 12 can represent a wide variety of stores and should not be limited to any particular business. The payment system 10 interfaces with a mobile device 14, such as a customer's smart phone, that has a computer processer that can run a payment app that is described in more detail below. The payment system 10 includes a point of sale payment terminal 16. The features of the terminal 16 are shown generally in FIG. 2. The terminal 16 includes a cash drawer 18 for retaining and securing cash. The cash drawer 18 should be lockable and secure. A card reader 20 can be provided to read payment information from credit cards and the like. More than one card reader 20 may be provided to read magnetic strip type payment cards as well as integrated circuit chip cards. One or more optical scanners 22 can be provided to read bar codes or QR codes. A mobile tablet 24 is provided that includes software that permits control of the point of sale terminal 16. The mobile tablet 24 should be adapted to communicate with the cash drawer 18, the card reader 20 and the optical scanner 22. The communication may be wired though hardware provided as part of the terminal, or may be wireless. The mobile tablet 24, such as an iPad or similar device, has a display screen 26 for displaying information, a touch screen 28 (which may be the same as the touch screen 26) for providing input, and a computer processor (not shown) programmed with software to control the cash drawer 18, the card reader 20, and the optical scanner 22. The software may be provided as an app that is downloaded to the tablet 24. The tablet 24 provides an interface for showing information to the merchant and receiving input from the merchant. A stand 30 is provided for supporting the mobile tablet 24 on the cash drawer 18. The stand 30, or other structure, can include a plurality of inputs for payment system hardware to permit payment system hardware to communicate with the mobile tablet 24. Extra inputs may be provided to allow additional hardware to be added. For example a printer 32 may be integrated with the terminal, or may be attached as an external component. The stand 30 is adapted to permit the mobile tablet 24 to swivel to facilitate entry of a customer verification through the mobile tablet touch screen 28. For example, the app may be set-up to permit customers to enter a PIN or to sign with a stylus to verify the transaction. The mobile tablet 24 may be in communication with a wireless router 36 to send and receive information remotely.

As seen in FIG. 1, a payment beacon 34 will preferably be integrated with the payment terminal 16. Alternatively, the payment beacon 34 can be provided separately from the payment terminal 16. The payment beacon 34 utilizes wireless communication technology to communicate with the wireless router 36 and with consumer's mobile devices 14. The communication protocol with the consumer's phone 14 may be Bluetooth or Bluetooth low energy (BLE), also known as Bluetooth Smart. The payment beacon 34 is a dual radio with the capability to pass encrypted payment information directly from a consumer's phone to the merchant's wireless router 36. Preferably, the payment beacon 34 will communicate with consumers' mobile devices 14 using Bluetooth or Bluetooth Low Energy and will communicate with the merchant's wireless router 36 via a wireless local area network (e.g., Wi-Fi) radio.

The payment system 10 may also include a hub beacon 38 and one or more proximity beacons 40. Each of the proximity beacons 40 is assigned a unique identifier. The proximity beacons 40 act as trackers to track the location of a customer's mobile device 14 within the merchant location 12, for example in which department the customer's mobile device 14 is located. The proximity beacons 40 also act as transmitters to deliver specific and timely content to the customer's mobile device 14. Accordingly, the proximity beacons 40 permit the merchant to provide content that relates specifically to the merchandise being viewed by a customer while the customer is viewing the merchandise. The communication protocol between the proximity beacons 40 and the consumer's mobile device 14 may be Bluetooth or Bluetooth low energy (BLE), also known as Bluetooth Smart. The hub beacon 38 serves as a hub for all of the proximity beacons 40 within the merchant location 12 as well as for the payment beacon 34. Alternatively more than one hub beacon 38 may be used to manage the proximity beacons 40 within various spaces within a single merchant location 12. The hub beacon 38 is also in direct communication with the wireless router 36, and permits management of the payment beacon 34 and proximity beacons 40 remotely through a remote management server 42 or servers, for example a cloud server. The wireless router 36 is also in communication with one or more payment servers 44. The payment server 44 coordinates payment in a secure manner using tokens that is described in greater detail below. The payment server 44 is in communication with various acquiring bank payment processors 46.

According to one feature of the present invention, a software app (customer app) is provided to be downloaded on to the customer's mobile device 14. Alternatively, the customer app could be downloaded on to a home computer. The customer app provides an interface for the customer to utilize the payment system 10 remotely. The customer app includes a log-in screen 48 shown in FIG. 3A that requires a user name and password input. Alternative verification process, such as biometric verification, or other known verification process may be utilized to identify the customer. The customer app converts the clear text payment data (such as a credit card number, validation code, etc) into a token, which is a randomized set of letters or numbers. A different token is generated for each payment type. These tokens are stored on the customer app rather than the payment data. This reduces the risk of a data breach because the payment data is not stored on the mobile device, and as will be described in more detail, is not provided to the merchant. According to another feature, the customer app includes a mobile (virtual) store front 50 (FIG. 3B) that permits a customer to view and select items or services for purchase through their mobile device 14 or home computer. A pay request screen 52 (FIG. 3C) includes a Pay It button 54 for a customer to verify their purchase request. Alternatively, if the customer is at the merchant location 12, the customer can present the items for purchase at the point of sale terminal 16, and the merchant can use the terminal 16 to initiate the payment request screen 52 on the customer's mobile device 14.

At least three types of purchase transactions are contemplated in association with the payment system 10. In a first transaction, the customer is not present at the merchant's location, but selects the items to be purchased and authorizes payment via a remote device, such as a home computer or mobile device that has the customer software app loaded. The customer can then pick-up the items as the merchant location 12. The proximity beacons 40 will sense the presence of the customer's mobile device 14 and alert the merchant, so that the merchant can get the items ready for the customer to take as soon as the customer enters the merchant location 12. This also provides an additional layer of security to verify that the customer is the correct person to pick-up the purchased items. In a second type of transaction the consumer is at the merchant's location, and the beacons in conjunction with the merchant app software on the mobile tablet 24 permit the customer to authorize payment of items to be purchased using the mobile device 14. In a third type of transaction, the system 10 does not include the mobile tablet 24 that has been programmed with the merchant's software app. Instead, the payment approval is generated by a legacy point of sale terminal that is connected to the payment beacon 34 via USB, WiFi, or Bluetooth. These three payment processes are described in greater detail below.

In the first situation where the customer initiates payment remotely from the merchant location 12, the customer opens the customer app on their mobile device 14. The customer finds the merchant's mobile store-front 50 (FIG. 3B) inside the application and selects their items for purchase. The customer sends the order in the application. The customer's order is sent via 3G/4G/LTE to the management server 42 and then to the point of sale terminal 16 via the merchant's wireless router 36. The merchant app on the mobile tablet 24 displays the incoming orders. The merchant selects the order from the incoming orders screen on the merchant interface. The merchant reviews the order and can either start the order or decline the order. The merchant selects start on the checkout screen (FIG. 4) to approve the order. Once the merchant selects start, the approval is sent back to the management server 42 to process payment. The management server 42 sends the amount and approval to the customer app on the mobile device 14. The customer app on the mobile device 14 initiates contact with the payment server 44. The payment server 44 is programmed with a tokenization application processing interface (tokenization API). The tokenization API requests a token and bill amount from the customer app. The customer app on the mobile device 14 sends the previously stored token associated with the selected payment method to the tokenization API on the payment server 44. The tokenization API permits the payment server to translate the token into an identifiable payment instrument. The tokenization API on the payment server 44 causes the payment server 44 to submit the payment request to the appropriate acquiring bank payment processor 46 associated with the identified payment instrument. The payment processor 46 returns the response (approved or declined) to the payment server 44, which notifies the customer app on the mobile device 14. The customer app on the mobile device 14 then notifies the management server 42, which in turn notifies merchant app on the mobile tablet 24, which generates an order ticket and places the order in progress. Once the order is in progress, the merchant app causes the mobile tablet 24 to notify the management server 42, which notifies the customer app on the mobile device 14 through a push notification that the order is in progress. When the order is complete (e.g., the merchant has gathered all of the items being purchased), the merchant selects Done on the merchant checkout screen Once the order is Done, the merchant app on the mobile tablet 24 then sends a message to the customer app on the mobile device 14 via the management server 42 that the order is ready, for example through a push notification. When the customer arrives at the merchant location 12, the proximity beacons 40 sense presence of the mobile device 14, and the mobile tablet 24 is notified that the customer has arrived. A list of customers screen 56 (FIG. 5) may be displayed showing all of the customers in the merchant location 12. The merchant calls out the customer's name, confirms that the customer is who they say they are, and presents them with their order. Once the customer takes their order, the merchant selects close on the checkout screen (FIG. 4) to close the order. Once the order is closed, the merchant app causes the mobile tablet 24 to notify the management server 42, which notifies the customer app through a push notification that the order is closed.

Figure 4:
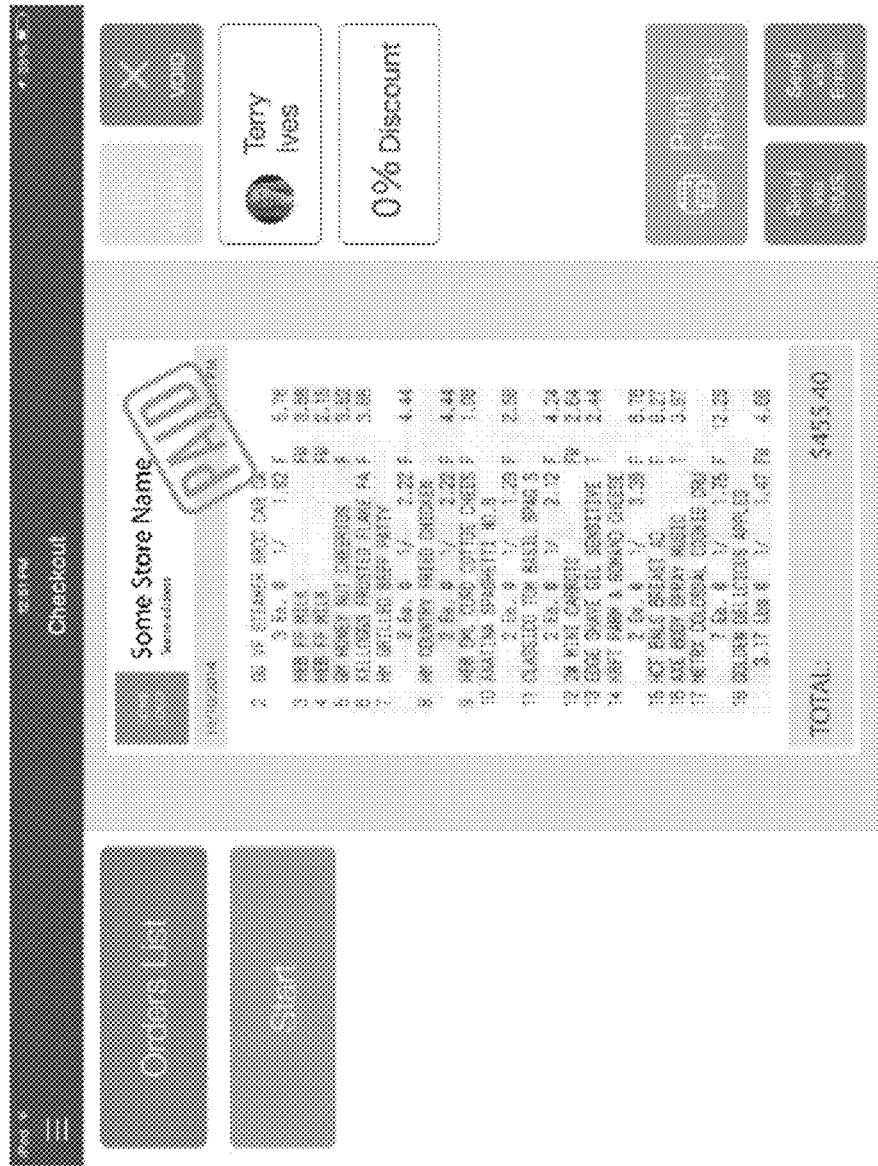
FIG. 4 is a screen of a mobile tablet showing a merchant checkout screen of a software app used in a point of sale terminal in some embodiments of the present invention.
Figure 5:
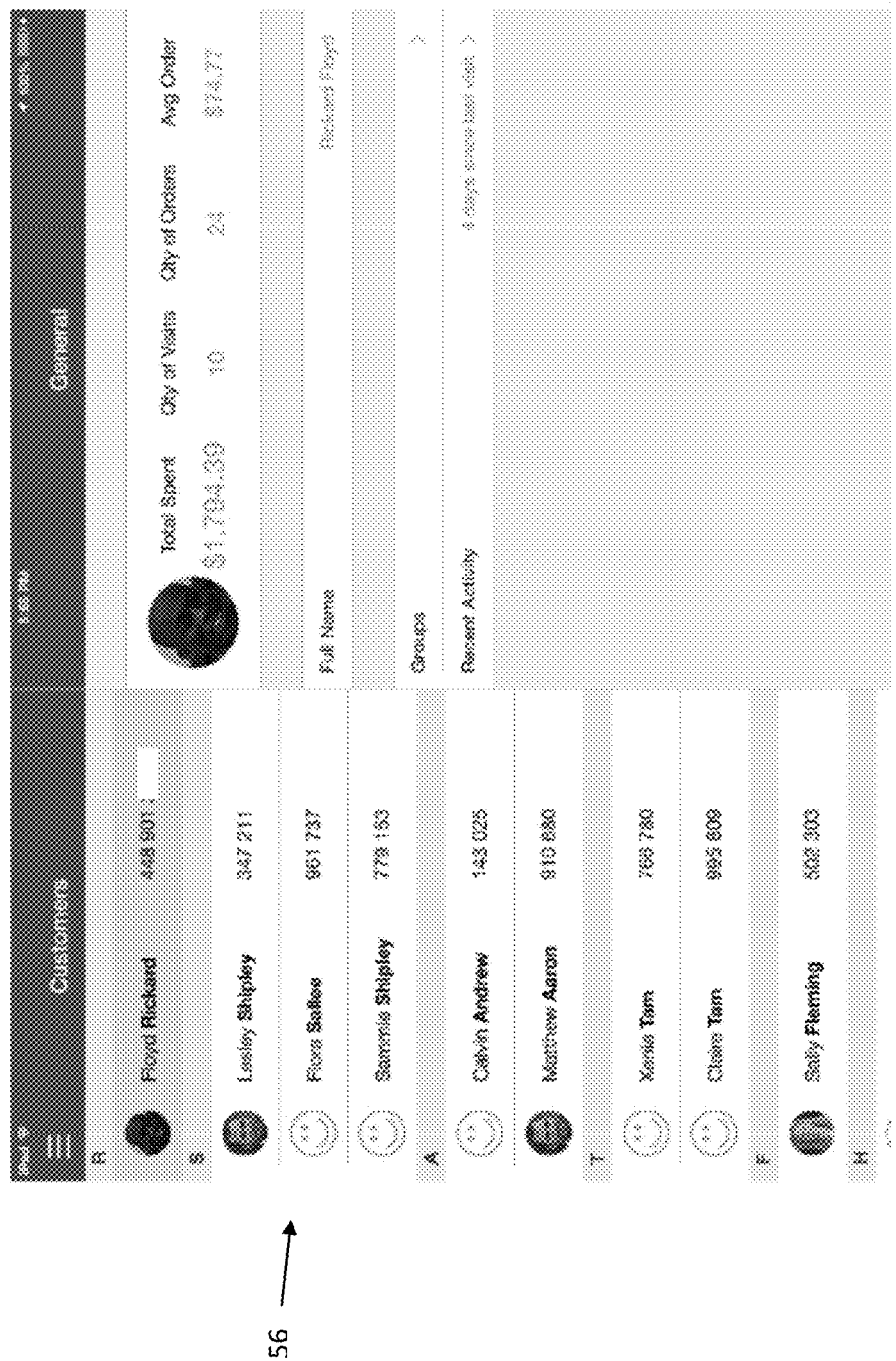
FIG. 5 is a screen of a mobile tablet showing a customer list screen of the software app used in a point of sale terminal in some embodiments of the present invention.

According to the second payment scenario a customer enters the merchant location 12 and is checked-in to the merchant's location by the customer app on the mobile device 14 communicating with the beacons 40. The customer's profile will be available to the merchant on the list of customers screen (FIG. 5) that can be generated by the merchant app on the mobile table 24. The proximity beacons will also track customer movement within the merchant location 12. The customer selects their items for purchase and presents them at the merchant POS terminal 16. The merchant places the items on the customer's profile and initiates a payment approval. The payment approval is sent to the customer's mobile device app via Bluetooth to the beacon, and then Bluetooth through the payment beacon 34 to the customer's mobile device 14 for confirmation. The customer selects their form of payment within the app. The customer selects Pay It and authenticates the order by Touch ID (e.g., biometric authentication) or PIN authentication. A token and amount is generated by the customer app on the mobile device 14, and is sent over Bluetooth and then Wi-Fi to the wireless router 34. The token/amount is sent from the merchant's wireless router 34 to the tokenization API on the payment server 44. The payment server then submits the payment request to the appropriate acquiring bank payment processor 46. The payment processor 46 returns the response (approved or declined) to the payment server 44. The payment server 44 notifies the merchant's app on the mobile tablet 24 and the customer's app on the mobile device 14 via the merchant's wireless router 36 of the response. The POS terminal prints the order ticket and places the order In Progress. Once the customer takes their order, the merchant selects close on the order screen (FIG. 4).

Figure 3C:
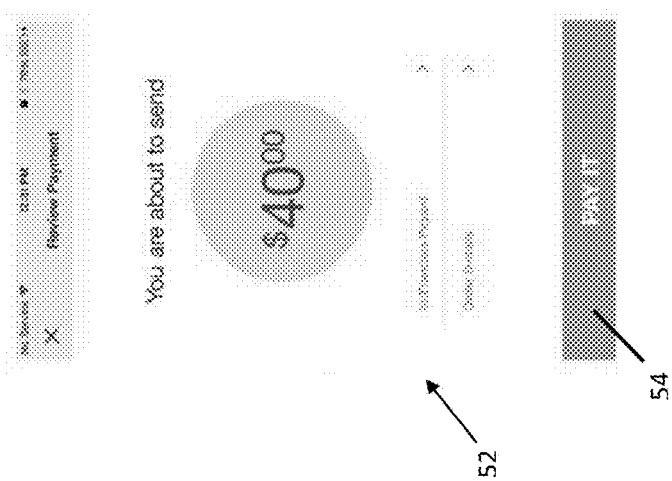
FIG. 3C is a screen of a customer's mobile device showing a payment approval screen for a customer software app used in the payment system of the present invention
Figure 3B:
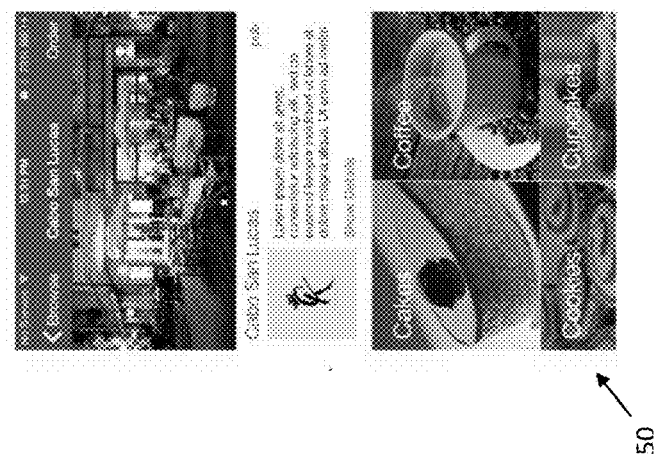
FIG. 3B is a screen of a customer's mobile device showing a mobile store front screen for the customer software app utilized in the present invention.
Figure 3A:
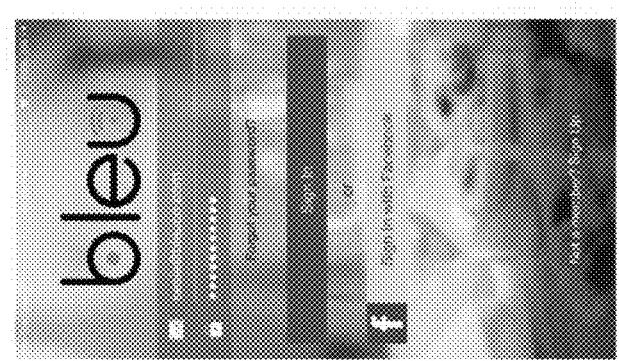
FIG. 3A is a screen of a customer's mobile device showing a log-in screen for a customer software app used in the payment system of the present invention.

A third purchase transaction can be accomplished without the need for the merchant to utilize the merchant app on a mobile tablet 24. This process works similarly to the above described payment processes, except a legacy (i.e., existing) point of sale terminal 16 is connected with a payment beacon 34 via USB, WiFi, or Bluetooth. This system can be used with or without the proximity beacons. The customer selects their form of payment within the customer app on their mobile device 14 and selects Pay It at the payment screen (FIG. 3C). The customer will authenticate the order, for example by biometric authentication, personal identification number, or password. The customer app sends the appropriate token information corresponding to the selected form of payment and payment amount either through the payment beacon 34 and wireless router 36 or via cellular communication to the tokenization API on the payment server 44. The tokenization API causes the payment server 44 to submit the payment request to the appropriate acquiring bank payment processor 46 corresponding with the selected payment form for approval. The payment processor 46 returns a response (approved or declined) to the payment server 44, which notifies the customer app on the mobile device 14 and the merchant point of sale terminal 16 of the response. If approved, the sale proceeds as described above.

According to another feature of the present invention, the payment system 10 can be used to collect and analyze data and to present offers to customers. Back-office software can be loaded on the management server 42 or other computer that is provided with data gathered by the system 10. When a customer with a mobile device 14 that has the customer app downloaded enters the merchant location 12, the mobile device 14 will connect with the proximity beacons 40. Each proximity beacon 40 has a unique ID that correlates to a specific identifier on the management server 42. When any of the proximity beacons 40 are in connection with the mobile device 14, an open session is created for that customer. When the customer downloads the customer app, the customer is required to enter certain information that permits the merchant app to identify the customer. As a customer moves within the merchant location, the customer's mobile device 14 transitions from one proximity beacon 40 to the next. Each customer visit is recorded in the customer profile as well detailed information about that visit such as the time and frequency spent in specific areas of the merchant location 12. When a customer pays through the payment system 10 using the customer app, additional information related to the amount, items purchased, and time of day are collected by the merchant app and stored on the management server 42 in a customer database for each customer.

Figure 6:
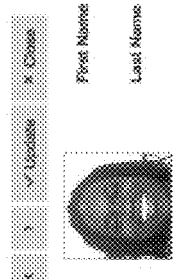
FIG. 6 is a computer screen showing a basic customer information screen of the back-end software app used in a point of sale terminal in some embodiments of the present invention.

The customers may be placed in groups according to various shared characteristics. The back-office software aggregates the data from an open session when the customer is at the merchant location with the past payment data associated with the customer. The back-office software includes a correlation algorithm that displays granular reporting and analytics for any customer with an open session. A basic customer information screen 58 (FIG. 6) may include information such as the customer name, contact information, and basic purchase statistics such as total purchases, number of purchases, and average purchase amount. A recent activity screen 60 may include information about recent purchases, such as date, amount, and location.

Figure 8:
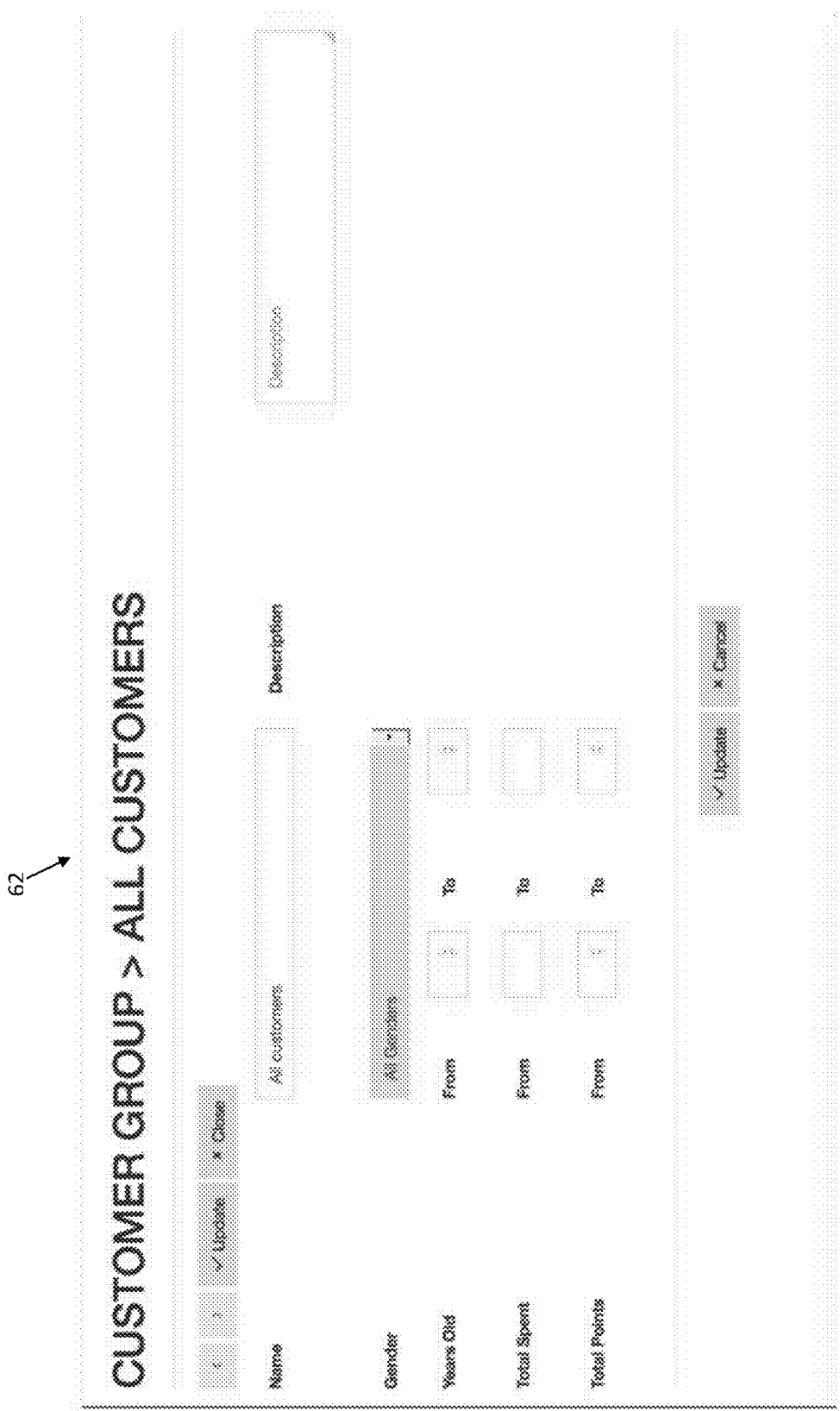
FIG. 8 is a screen of a computer showing a rules engine screen of a back-end software app used in a point of sale terminal in some embodiments of the present invention.

The back-office software may also include a customer relationship management module that can be used to create specific campaigns for individual customers or groups of customers. Groups can be created by setting parameters using a rules engine algorithm. A rules engine screen 62 is shown in FIG. 8. If a customer is identified as being in a group to which a campaign is directed, the back-office software can initiate contact with the customer's mobile device 14. The contact can be triggered to occur at a set time, or upon a set occurrence, such as the customer coming to the merchant location 12. For example, when the beacons 40 determine that a mobile device 14 with the customer app is at the merchant location 12, a customer session is initiated. If the rules engine determines that the customer fits within the end points of a campaign, a specific response is delivered to the mobile device 14, either via cellular connection or via the WiFi router 36 and beacons 40. The response may simply be a message welcoming the customer back, or, could be more focused. For example, the response could be additional information related to the products in the area of the store where the customer is located, as determined by the proximity beacons 40. Alternatively, it could be information about a sale or promotion on items that the customer has previously purchased, or located in areas where the customer has previously spent a significant amount of time.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A mobile payment system comprising:
   a mobile point of sale terminal, the terminal including a payment beacon, the payment beacon being adapted to communicate with mobile devices programmed with a customer application;
   a wireless router in communication with a management server;
   a universal payment gateway device that communicates with the payment beacon and transmits payment information to an acquiring bank through the wireless router;
   a plurality of proximity beacons that transmit to and receive information from mobile devices programmed with the customer application;
   a hub beacon adapted to communicate between the wireless router and the proximity beacons; and
   wherein the management server is adapted to receive and store data from the wireless router and to control the master beacon, the payment beacon, and the universal payment gateway device.

2. The mobile payment system of claim 1, wherein the payment beacon is a dual radio that uses Bluetooth to communicate with customer's mobile devices and Wi-Fi to communicate with wireless router.

3. A method of processing an electronic payment comprising:
   providing a mobile app that can be downloaded to a customer's mobile device, whereby the mobile app stores a token on the mobile device corresponding with payment information;
   providing a mobile point of sale terminal including a payment beacon and a mobile tablet at a merchant location;
   providing a wireless router in communication with a management server;
   receiving at the payment beacon a signal indicating an order from a customer, wherein the order was placed by the customer using a mobile store-front generated by the mobile app on the customer's mobile device, wherein the order is an item for purchase by the customer;
   transmitting the order from the payment beacon to the mobile tablet;
   providing a notification on the mobile tablet that the order has been placed;
   reviewing the order on the mobile tablet to approve or decline the order;
   sending a notice to the customer's mobile device using the payment beacon, the wireless router, and the management server indicating whether the order was approved or declined; and
   if the order is approved in the reviewing step:
   the management server sends an approval notice to the customer's mobile device;
   the customer's mobile device sends the approval notice, token, and payment amount to a payment server;
   the payment server submits a payment request for the payment amount to a payment processor server for approval;
   the payment processor server notifies the payment server whether the payment request is approved or declined;
   the payment server notifies the customer's mobile device whether payment was approved or declined;
   the customer's mobile device notifies the mobile point of service terminal whether the payment was approved or declined;
   if the payment was approved the mobile point of sale terminal generates an order ticket;
   once the order ticket has been completed, the mobile point of sale terminal notifies the customer's mobile device using the payment beacon, the Wi-Fi router, and the management server; and
   when the customer's mobile device is within proximity of the payment beacon, the payment beacon causes the mobile tablet to display a notification so that the merchant can present the customer with their order.

4. A method of processing an electronic payment comprising:
   providing a mobile app downloaded to a customer's mobile device, whereby the mobile app stores a token on the mobile device corresponding with payment information;
   providing a mobile point of sale terminal including a payment beacon, a hub beacon, a plurality of proximity beacons, and a mobile tablet at a merchant;
   providing a wireless router in communication with a management server;
   connecting the proximity beacons with the customer's mobile device to deliver content to the customer's mobile device and to track movement of the customer within the merchant;
   displaying a profile of a customer on the mobile tablet;
   placing indicators of items selected for purchase by the customer on the customer's profile using the mobile tablet;
   sending a request for payment to the customer's mobile device, whereby the customer's mobile device sends the token to a payment server, whereby the payment server submits a payment request to a payment processor server for approval, and the payment processor server notifies the payment server whether the payment request is approved or declined, and the payment server notifies the customer's mobile device and the mobile point of sale terminal whether payment was approved or declined;
   if the payment was approved, generating an indication on the mobile tablet of the approval so that the merchant can present the customer with the items selected for purchase.

* * * * *